United States Patent
Sartor et al.

(10) Patent No.: US 10,853,624 B2
(45) Date of Patent: Dec. 1, 2020

(54) APPARATUS AND METHOD

(71) Applicant: SONY CORPORATION, Tokyo (JP)

(72) Inventors: Piergiorgio Sartor, Stuttgart (DE); Mori Hironori, Stuttgart (DE); Alexander Gatto, Stuttgart (DE); Ralf Müller, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 120 days.

(21) Appl. No.: 16/162,676

(22) Filed: Oct. 17, 2018

(65) Prior Publication Data

US 2019/0114469 A1    Apr. 18, 2019

(30) Foreign Application Priority Data

Oct. 17, 2017 (EP) .................................. 17196937

(51) Int. Cl.
| | |
|---|---|
| *G06K 9/00* | (2006.01) |
| *G06K 9/46* | (2006.01) |
| *G06K 9/22* | (2006.01) |
| *G06K 9/20* | (2006.01) |
| *G06T 7/507* | (2017.01) |

(52) U.S. Cl.
CPC ..... *G06K 9/00281* (2013.01); *G06K 9/00255* (2013.01); *G06K 9/00892* (2013.01); *G06K 9/2027* (2013.01); *G06K 9/22* (2013.01); *G06K 9/4619* (2013.01); *G06K 9/00006* (2013.01); *G06K 9/00221* (2013.01); *G06K 9/00597* (2013.01); *G06K 9/209* (2013.01); *G06T 7/507* (2017.01); *G06T 2207/30196* (2013.01)

(58) Field of Classification Search
CPC ........... G06K 9/00281; G06K 9/00255; G06K 9/00892; G06K 9/2027; G06K 9/22; G06K 9/4619; G06K 9/00006; G06K 9/00221; G06K 9/00597; G06K 9/209; G06T 7/507; G06T 2207/30196
See application file for complete search history.

(56) References Cited

U.S. PATENT DOCUMENTS

| | | | |
|---|---|---|---|
| 9,613,281 B2 | 4/2017 | Hanna et al. | |
| 2011/0163163 A1 | 7/2011 | Rowe | |
| 2015/0261999 A1* | 9/2015 | Thiebot | G06K 9/00288 348/222.1 |

(Continued)

FOREIGN PATENT DOCUMENTS

WO    2008/131201 A1    10/2008

OTHER PUBLICATIONS

Hui, Z., Sankaranarayanan, A.C., Sunkavalli, K. and Hadap, S., May 2016. White balance under mixed illumination using flash photography. In 2016 IEEE International Conference on Computational Photography (ICCP) (pp. 1-10). IEEE.*

(Continued)

*Primary Examiner* — Zhitong Chen
(74) *Attorney, Agent, or Firm* — Xsensus LLP

(57) ABSTRACT

An apparatus has a circuitry which detects a first biometric feature of a user; detects a second biometric feature of the user, wherein the second biometric feature is detected based on image data representing the second biometric feature, and wherein the second biometric feature differs from the first biometric feature; and estimates an illumination indication for the second biometric feature, based on the image data.

17 Claims, 10 Drawing Sheets

(56) References Cited

U.S. PATENT DOCUMENTS

| | | | | |
|---|---|---|---|---|
| 2016/0055387 A1* | 2/2016 | Hanna | ............... | G06K 9/00604 |
| | | | | 348/78 |
| 2017/0076142 A1* | 3/2017 | Chang | ............... | G06K 9/00281 |
| 2018/0181795 A1* | 6/2018 | Nakano | ............. | G06K 9/00228 |

OTHER PUBLICATIONS

Jiangwei, L. et al., "Live Face Detection Based on the Analysis of Fourier Spectra," Proceedings of the SPIE, vol. 5404, Aug. 2004, pp. 1-8.
Hui, Z. et al., "White Balance under Mixed Illumination using Flash Photography," IEEE International Conference on Computational Photography (ICCP), May 13-15, 2016, pp. 1-10.

* cited by examiner

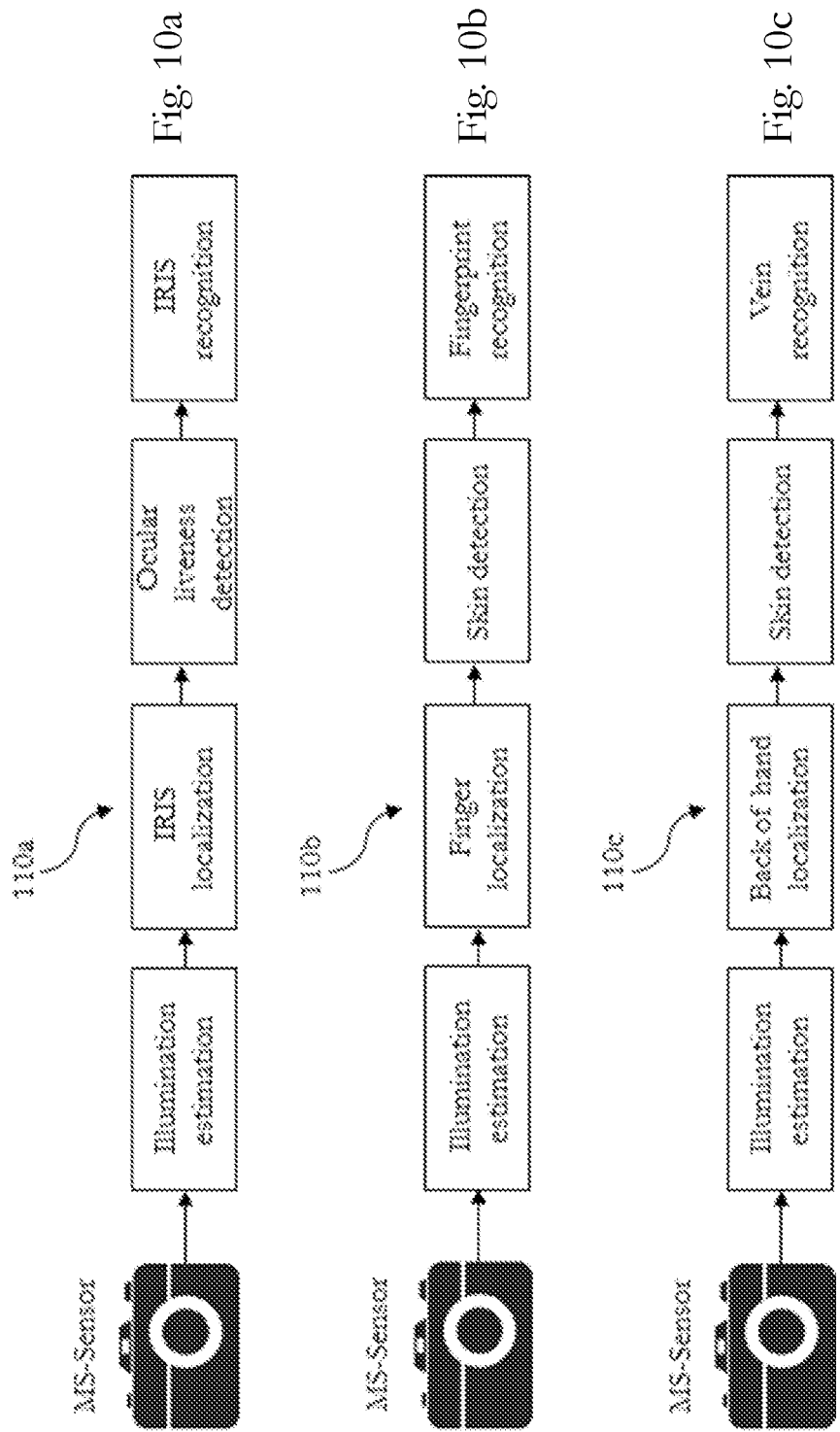

APPARATUS AND METHOD

CROSS-REFERENCE TO RELATED APPLICATION

The present application claims priority to European Patent Application 17196937.1 filed by the European Patent Office on 17 Oct. 2017, the entire contents of which being incorporated herein by reference.

TECHNICAL FIELD

The present disclosure generally pertains to an apparatus and a method in the general field of detecting biometric features.

TECHNICAL BACKGROUND

Conventional devices for biometric identification are typically based on, for example, recognizing a set of biometric characteristics, which are measureable, distinctive, and may be unique to an individual person. Then, the biometric characteristics are analyzed, and may be verified, and for example, the individuals are identified, authenticated, or the like.

Moreover, it is known that biometric identifier devices exist which are based on pattern recognition, and enable an individual identification by determining the authenticity of a specific physiological or behavioral characteristic possessed by the individual.

However, known biometric identifier devices may be limited on verification procedure. For example, a biometric identifier device which works based on the face recognition, may resolve a real human face, as well as e.g. a face figure included in a picture. Hence, it may not be recognized that a biometric feature (e.g. a face) does not belong to a genuine individual, but to a fake copy such as a mask, a reproduced face, an artificial material, etc.

Although there exist techniques for biometric identification of individuals, e.g., based on fingerprint, face recognition, etc., it is generally desirable to improve apparatus and methods for detecting biometric features.

SUMMARY

According to a first aspect, the disclosure provides an apparatus including circuitry configured to detect a first biometric feature of a user, detect a second biometric feature of the user, wherein the second biometric feature is detected based on image data representing the second biometric feature, and wherein the second biometric feature differs from the first biometric feature, and estimate an illumination indication for the second biometric feature, based on the image data.

According to a second aspect, the disclosure provides a method including detecting a first biometric feature of a user, detecting a second biometric feature of the user, wherein the second biometric feature is detected based on image data representing the second biometric feature, and wherein the second biometric feature differs from the first biometric feature, and estimating an illumination indication for the second biometric feature, based on the image data.

Further aspects are set forth in the dependent claims, the drawings and the following description.

BRIEF DESCRIPTION OF THE DRAWINGS

Embodiments are explained by way of example with respect to the accompanying drawings, in which:

FIGS. 10a, 10b and 10c illustrate a schematic diagram of an embodiment of a system for detecting multiple biometric features.

DETAILED DESCRIPTION OF EMBODIMENTS

Figure 1:
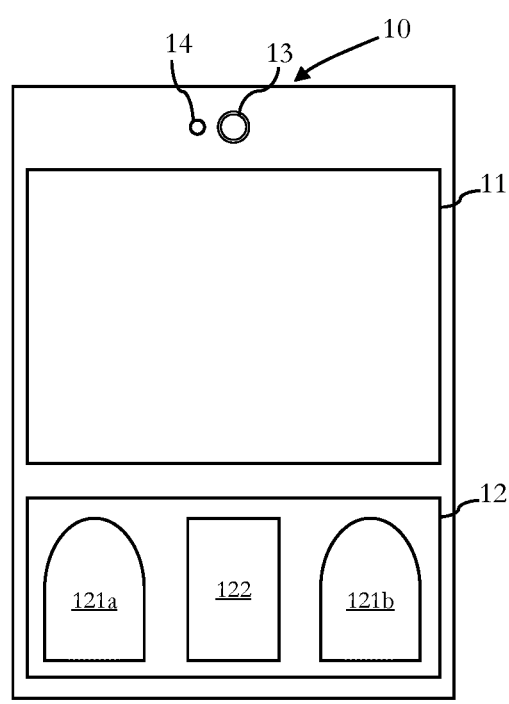
FIG. 1 schematically illustrates an embodiment of an apparatus in the form of a biometric identifier device for detecting biometric features.

Before a detailed description of the embodiments under reference of FIG. 1 is given, general explanations are made.

As mentioned in the outset, generally it is known to perform a biometric identification, for example, using a biometric identifier device which works based on e.g., a fingerprint scan, a face recognition identification, etc.

For instance, it is known that, using conventional biometric devices, a distinctive physiological characteristic such as a fingerprint, hand geometry, etc., is scanned. Then, the distinctive characteristics are measured and the biometric feature is labeled, and is further used to identify an individual, authenticate the individual, or the like.

It has been recognized that, for improving usability of the biometric identifier devices, it is desirable to improve their robustness such that a biometric identifier device should be able to, for example, verify that a fingerprint belongs to a living human and it is not an artificial copy, or the like.

Consequently, some embodiments pertain to an apparatus including circuitry configured to detect a first biometric feature of a user, detect a second biometric feature of the user, wherein the second biometric feature is detected based on image data representing the second biometric feature, and wherein the second biometric feature differs from the first biometric feature, and estimate an illumination indication for the second biometric feature, based on the image data.

The apparatus may be or may include an identification device, an authentication device, a verification device, a consumer electronic device, or the like.

The apparatus may be any electronic device which is able to detect the biometric features. For example, the apparatus may be or may include a smartphone, a video game console (e.g. a play station), a digital camera, a smart television, a tablet computer, a personal computer, a laptop, a server, a radio receiver, an MP3 player, a DVD player, etc. For instance, the apparatus may be a smart phone and a biometric detector may be integrated into the power button positioned on the smartphone, or the like.

The circuitry may include one or more processors, one or more microprocessors, dedicated circuits, logic circuits, a memory (RAM, ROM, or the like), a storage, output means (displays (e.g. liquid crystal, (organic) light emitting diode, etc.)), microphone, loudspeaker, etc., an interface (e.g. touch screen, a wireless interface such as Bluetooth, infrared, etc.), etc., as it is generally known in typical consumer electronics devices e.g. smartphones, video game consoles, etc.

The circuitry detects a first biometric feature of a user. The biometric feature may be for example any distinctive and/or measurable characteristic which may be used for identification, verification, authentication, access control, or the like.

The biometric feature may be based on a physiological characteristic, such as fingerprint, iris, face detection, face recognition, retina, DNA, palm veins, palm print, hand geometry, ocular liveness detection, etc., and/or behavior characteristics such as voice, signature, type, etc. For example, in some embodiments, the first biometric feature may be detected based on a face recognition, an iris recognition, a retina recognition, a hand geometry recognition, a fingerprint recognition, a vein recognition, a voice recognition, a finger localization, a back of hand localization, an iris localization, an iris recognition, a pupil dilation, and/or an ocular motion detection, or the like.

The circuitry further detects a second biometric feature of the user. There is no limitation on the type of the first and the second biometric feature. Moreover, the second biometric feature may be detected based on image data representing the second biometric feature. For example, the apparatus and/or its circuitry may further include a camera (e.g. based on an image sensor) configured to capture an image of the biometric feature and/or a characteristic which may represent the biometric feature. Moreover, the image data may represent the biometric feature and the circuitry may be configured to detect the second biometric feature based on the image data.

In some embodiments, the image data may be generated by another device and the apparatus and/or its circuitry may obtain the image data, for example via its interface, or the like. Moreover, the circuitry may analyze the image data and may further detect the second biometric feature.

For instance, in some embodiments where the detected biometric feature is a fingerprint, the circuitry may analyze the image data for specific features of the fingerprint, such as minutiae. Moreover, the circuitry and/or a program running on the circuitry may measure, for example, the distances and angles between these features, and may further convert the detected biometric feature to a unique code, or the like.

In some embodiments, the second biometric feature differs from the first biometric feature. Hence, in some embodiments, multiple biometric features may be detected and the circuitry may detect the multiple biometric features, for example, directly, based on image data, or the like, as discussed above.

Hence, in some embodiments, it is possible to detect a second biometric feature and it may support the first biometric feature and may further enhance e.g., an identification process, an authentication process, a verification process, etc.

Moreover, the circuitry is configured to estimate an illumination indication for the second biometric feature, based on the image data.

The illumination indication may be illumination data, chromaticity of the ambient illuminant, an illumination type, an illumination color, a spectrum of illumination, an illumination function, ambient illumination information, spectral distribution of illumination, etc. Moreover, illumination indication is estimated based on the image data. For example, illumination indication may be directly derived from e.g., the image data, the preprocessed image data, logarithmic derivation of the image data etc., without limiting the present disclosure in that regard. Likewise, the illumination indication may be estimated based on general information of illumination, for example, estimating independent illumination information in a generic way, classifying the illumination based on their source, extracting illumination information from the image data, etc.

The circuitry may further include one or more biometric sensors, for example, it may have different sensors for different biometric features and may further directly detect the biometric features through its sensors (e.g. image sensor, fingerprint sensor, face recognition sensors, multispectral sensors, 3D sensing sensors, etc.).

In some embodiments, the first biometric feature of the user may be used for identifying an individual, and the second biometric feature may be used for discriminating between a biometric feature and a non-biometric feature.

For instance, the first biometric feature of the user may be used and the user may be identified. Moreover, the second biometric feature may be used in which it may be able to discriminate between a biometric feature (e.g. a real biometric feature) and a non-biometric feature (e.g. a fake material used as a biometric feature in the area that the first biometric feature is detected). Furthermore, the biometric feature (e.g. the first biometric feature) may be validated as a real biometric feature.

Moreover, the circuitry may be configured to perform that the first biometric feature of the user to be used for identifying an individual, and the second biometric feature of the user to be used for discriminating between a biometric feature and a non-biometric feature.

In some embodiments, the first biometric feature detection may be performed on a corresponding area where the second biometric feature is detected as the biometric feature.

For example, in some embodiments, a corresponding area of a user, e.g., an area on the face, a fingerprint area, etc., may be used and the second biometric feature may be detected and it may be verified as the biometric feature (e.g. a real biometric feature). Moreover, the first biometric feature detection may be performed on the same area in which the second biometric feature is detected.

In some embodiments, the second biometric feature detection may be performed on a corresponding area where the first biometric feature is located.

For example, in some embodiments, a corresponding area of a user, e.g., an area on the face, a fingerprint area, etc., may be used and the first biometric feature may be detected. Moreover, the second biometric feature detection may be performed on the same area in which the first biometric feature is located.

In some embodiments, the circuitry may further be configured to authenticate the user identified based on the first biometric feature when the second biometric feature indicates a biometric feature.

For example, in some embodiments, the first biometric feature may be used and the user may be identified. Moreover, the second biometric feature may be used, e.g., on the same area in which the first biometric feature is detected, and it may indicate a real biometric feature. Moreover, the circuitry may further be configured to authenticate the user, for example, by using the detected biometric feature and identification information of the users which may be stored, e.g., in a database on the circuitry, etc.

In some embodiments, the second biometric feature may be a binary value indicating a real biometric feature or a fake biometric feature.

For example, the second biometric feature may be based on a binary value such as, a 0/1 value, in which the 0 value being indicative of a fake biometric feature and the 1 value being indicative of a real biometric feature.

In some embodiments, the second biometric feature may be a value indicating a probability of a real biometric feature.

For example, the second biometric feature may be a value between 0 and 100, moreover, the values may be indicative of a probability of a real biometric feature. For instance, a zero value being indicative that the probability of the biometric feature being a real biometric feature is 0%. Moreover, a 100 value may be indicative that, the probability of the biometric feature being a real biometric feature is 100%. Moreover, the second biometric feature can be any number in between 0 and 100, or the like.

In some embodiments, the second biometric feature is a skin feature, and the circuitry may further be configured to estimate the illumination indication for the skin feature.

For example, skin feature and/or skin characteristics that are unique (e.g. due to the hemoglobin chemistry), such as, spectral bands of a real skin, may be detected. The skin feature may be detected based on the image data of one or more multi spectral images, hyperspectral images, etc., and the illumination indication may be estimated for the detected skin feature.

The multi spectral images or the hyperspectral images may be in the visible range, may further include spectral band of, for example, far infrared (e.g. corresponding to thermal imaging), etc. The image data may include values distributed in space and in wavelength (e.g. for 3D object), as it is generally known.

In some embodiments, the illumination indication may be estimated based on first image data and second image data, and wherein the first image data correspond to a first illumination condition and the second image data correspond to the second illumination condition.

For example, a scene which has unknown illumination condition and may include a biometric feature and/or a characteristic representing the biometric feature is considered for estimating the illumination indication. Moreover, in order to estimate the illumination indication, a first image of the scene with a first illumination condition and a second image of the scene with the second illumination condition may be captured, and the first image data and the second image data may be generated. Furthermore, the first image data and the second image data may be represented, for example, by a physically-based model of image formation which is based on the assumptions of Lambertian surfaces, Planckian lights, and narrowband camera sensors, as it is generally known in the image processing techniques.

The first image data and the second image data may be spectrally sharpened, and the logarithmic derivation (which is generally known in mathematics and, thus, within the common general knowledge of the skilled person) of the first image data and the second image data may be determined. Moreover, the difference between the logarithmic derivation of the first image data and the logarithmic derivation of the second image data may be determined, and for example, by projecting the difference into a geometric-mean chromaticity space, the chromaticity of e.g. the ambient illumination in this embodiment, may be estimated. Hence, in some embodiments, the illumination indication (e.g. chromaticity of the ambient illumination) may be estimated.

Note that there is no limitation on the method of estimating the illumination indication. For example, the illumination indication may be estimated with any one of the methods which are based on the active illumination such as, a flash/no-flash method, a pure flash method, a log-difference geometric-mean chromaticity method, etc., and/or being estimated with a method which is based on a passive sensing, such as a passive illumination estimation method.

In some embodiments, the image data (i.e. the first image data and the second image data) may correspond to e.g. multispectral images, hyperspectral images, etc. Moreover, the image data of the multispectral images and/or the hyperspectral images may be used and the biometric features may be detected. In some embodiments, the image data may include for example, 3D information, 3D sensing data, polarization information, or the like.

In some embodiments, the first illumination condition corresponds to an image captured with a known illumination source.

For example, the illumination indication may be estimated based on a flash/no-flash method. The method introduces a flash light (i.e. known illumination) into a scene, and the reflected light is used to estimate the illuminant indication. Moreover, a first image is captured with the flash light source (i.e. known illumination source) and a second image is captured without flash light, and first image data and second image data are generated, accordingly. Therefore, the first image data correspond to the first illumination condition (image with the flash) and the second image data correspond to the second illumination condition (image without the flash).

In some embodiments, the circuitry may further be configured to determine image data corresponding to the known illumination source, based on subtracting a logarithmic derivation of the first image data and the second image data.

As discussed above, in some embodiments, a known illumination source such as a flash light source (e.g. of a camera) may be used. Moreover, the circuitry may determine the image data corresponding to the flash light source. For instance, the illumination indication may be estimated based on the flash/no flash method, wherein image data are captured with an active and non-active flash. Moreover, the first image data are generated which correspond to the image with the flash (flash activated), and the second image data are generated which correspond to the image without the flash (flash not activated). Furthermore, the logarithmic derivation of the first image data and the second image data may be determined. Additionally, subtracting the logarithmic derivation of the second image data from the logarithmic derivation of the first image data provides the logarithmic derivation of image data corresponding to the flash light source (i.e. known illumination source). Hence, in some embodiments, the image data corresponding to the known illumination source (e.g. flash light source) may be determined.

Moreover, in some embodiments, the image data of the known illumination source may be used and the illumination source may be determined, identified, etc. For example, as discussed above, the logarithmic derivation of the image data corresponding to the known illumination source may be determined and may further be projected into a geometric-mean chromaticity space and the chromaticity of the known illumination source may be estimated.

Furthermore, the chromaticity corresponding to different illumination sources with different temperatures may fall, for example, along a line on a plane in the geometric-mean chromaticity space.

Moreover, the Euclidean distance which represents the straight-line distance between two lines may be estimated, and by taking the nearest color temperature along this line (which corresponds to the illumination with minimum Euclidean distance), and/or classifying into one of potential illumination sources, the illumination source may be identified, may be estimated, etc.

Hence, in some embodiments, it is possible to estimate the ambient illumination (e.g. the chromaticity of the ambient illumination) as illumination indication.

In some embodiments, it is possible to estimate the image data of the known illumination (e.g. chromaticity of the known illumination source) as the illumination indication.

In some embodiments, it is possible to estimate the illumination source as the illumination indication, as discussed above.

In some embodiments, the circuitry may further be configured to extract a skin portion from the first image data and the second image data.

The image data may be processed, for example, the measurement noise may be reduced, or the like. The processing may include a pre-processing, a post-processing, etc., as it is generally known for the image processing techniques. Moreover, the skin portions may be extracted from the image data (i.e. the first image data and the second image data).

For instance, the circuitry and/or a program running on the circuitry may perform e.g., the pre-processing and may extract the skin portions from the image data and/or parts of the image data that may include e.g. a skin feature.

The skin portion is a portion that may be or may include e.g., a skin feature (e.g. an invariant feature of the skin, a meaningful feature of the skin), a skin attribute, a skin characteristic, a skin site, etc.

In some embodiments, the circuitry may further be configured to analyze the skin portion with a machine learning algorithm configured to determine whether the skin portion meets a predefined criterion being indicative of real skin.

As discussed, the skin portions may be extracted, e.g. during the pre-processing. The extracted skin portions may be analyzed to, e.g., identify real skin, detect fake skin, etc.

The circuitry may analyze the skin portions with a machine learning algorithm. The machine learning algorithm may be based on feature extraction techniques, classifier techniques or deep-learning techniques. Feature extraction may be based on at least one of: Scale Invariant Feature Transfer (SIFT), Cray Level Co-occurrence Matrix (GLCM), Gaboo Features, Tubeness or the like. Classifiers may be based on at least one of: Random Forest; Support Vector Machine; Neural Net, Bayes Net or the like. Deep-learning may be based on at least one of: Autoencoders, Generative Adversarial Network, weakly supervised learning, boot-strapping or the like.

The skin portions may be analyzed based on a statistical analysis such as, determining e.g. a mean value, a standard deviation, etc., and/or an analytical analysis such as determining, a Fourier transform, a wavelet, etc., and may further be normalized, or the like.

The predefined criterion may be based on e.g., a skin feature, an invariant skin characteristic, etc. For instance, the invariant skin characteristic may deliver invariant information in different conditions. The different conditions may be illumination color, shading, illumination polarization, illumination wavelength, ambient illumination, environmental conditions (e.g. temperature, humidity, touch, heat, and cold), etc.

Moreover, the predefined criterion may be based on, for example, the image data and/or the image quality, detecting different characteristics of the skin in the image data, such as epidermis, hair follicle, concentration of melanin in the epidermal layer, concentration of hemoglobin in the dermal layer, or the like.

Moreover, the skin portions which may deliver the invariant information in a different condition may meet the predetermined criterion and may be indicative of real skin.

Hence, in some embodiments, it may be possible to discriminate between real skin (genuine tissue) and fake skin or an attempt to spoof the sensor using an artificial or altered sample, or the like. For instance, the image data of two images which are captured under different polarization conditions may be used. The different polarization conditions may have certain characteristic properties for skin that may not be the same for some other types of materials.

The circuitry may further determine the skin portions which meet the predetermined criterion as real skin. In some embodiments, the circuitry (e.g. an estimator in the circuitry) and/or the machine learning algorithm may determine the skin portions being indicative of real skin with a binary operation, such as associating a "0" value to skin portions being indicative of non-skin (i.e. do not meet the predetermined criterion) and a "1" value to skin portions being indicative of real skin (i.e. skin portions which meet the predetermined criterion), without limiting the present disclosure in regard to specific numbers.

In some embodiments, the circuitry (e.g. an estimator in the circuitry) and/or the machine learning algorithm may determine the skin portions being indicative of the real skin based on a probabilistic estimation. For instance, a probability that the skin portion being indicative of the real skin may be from 0 to 1, in which "0" corresponds to non-skin and "1" to real skin.

In some embodiments, the circuitry may further be configured to generate a skin map based on the machine learning algorithm, and the skin portions being indicative of real skin.

For example, the circuitry and/or the machine learning algorithm may generate the skin map. Moreover, the skin map may be based on the skin portions being indicative of real skin. For instance, the machine learning algorithm may classify the skin portions into real skin and non-skin portions, and may further combine the skin portions which are classified as real skin and may generate the skin map.

In some embodiments, the skin map may contain only skin portions which are indicative of real skin.

In some embodiments, the skin map may contain only skin portions which are not indicative of real skin (being indicative of non-skin (e.g. of non-living skin but fake skin).

In some embodiments, the skin map may contain all skin portions (i.e. being indicative of real skin and being indicative of non-skin). Moreover, the machine learning algorithm may generate the skin map based on the binary operation (e.g. assigning a "0" to non-skin and "1" to real skin) or probabilistic operation (probability of skin from 0 to 1), as discussed above. Additionally, the location of the non-skin parts, the location of fake skin, the location of artificial materials, etc., may be determined.

In some embodiments, a post processing module may be performed for, e.g., improving the skin map. For example, in some embodiments where the skin map is generated based on the binary operation, the post processing may be based on a morphological operator, and it may further be configured to perform e.g., erosion, dilation, opening, closing, different combinations of post processing, etc., as it is generally known in image processing techniques.

In some embodiments, the apparatus may detect the skin feature by also considering the detected first biometric feature. For example, in some embodiments the apparatus detects the face recognition feature as the first biometric feature and detects the skin feature as the second biometric feature. The circuitry and/or the machine learning algorithm may e.g. extract the skin portions, generate the skin map, etc., based on the area which a face is detected, or the like.

In some embodiments, the circuitry may be further configured to identify the user based on the detected first biometric features.

Hence, in some embodiments, it is possible to detect the first biometric feature and the second biometric feature. Moreover, the detected first biometric features may be used and the user may be identified.

In some embodiments, the apparatus may further store, for example, the detected biometric features, or a code representing the detected biometric feature, on a database, (temporarily or indefinitely) or automatically compare it with one or many other biometric features such as a fingerprint to find a match. Likewise, the user may be identified, verified, authenticated, etc.

In some embodiments, the user authentication may be performed and the apparatus may detect the skin feature after the authentication procedure. Moreover, the personal skin information of the user, such as his/her face, skin map, skin color, may be used and the machine learning algorithm may e.g. generate the skin map, improve the skin map, verify the skin map, etc., based on the personal user information.

In some embodiments, the spectrum properties of a biometric feature (e.g. acquired by an image sensor) may depend on the ambient illumination condition. Hence, in some embodiments, it is possible to estimate the illumination indication and a robust biometric identifier device may be achieved.

In some embodiments, additional complications may exist (due to e.g., color ambiguities, ambient illumination, etc.), and it may be possible to e.g., detect a skin feature, perform a face recognition, a fingerprint identification, etc.

Some embodiments pertain to a method including, detecting a first biometric feature of a user, detecting a second biometric feature of the user, wherein the second biometric feature is detected based on image data representing the second biometric feature, and wherein the second biometric feature differs from the first biometric feature, and estimating an illumination indication for the second biometric feature, based on the image data. The method may be performed by the apparatus such as the apparatus discussed herein, and/or its circuitry, or by any other electronic processing device.

As discussed, the method may include detecting the second biometric feature, and the second biometric feature may be a skin feature, and the method may further include estimating the illumination indication for the skin feature. Moreover, the illumination indication may be estimated based on first image data and second image data, and wherein the first image data correspond to a first illumination condition and the second image data correspond to the second illumination condition. Furthermore, the first illumination condition may correspond to an image captured with a known illumination source, as discussed above. The method may further include determining image data corresponding to the known illumination source, based on subtracting a logarithmic derivation of the first image data and the second mage data. As discussed above, the method may further include extracting a skin portion from the first image data and the second image data. Moreover, the skin portion may be analyzed with a machine learning algorithm configured to determine whether the skin portion meets a predefined criterion being indicative of a real skin. As discussed above, the method may further include generating a skin map based on the machine learning algorithm, and the skin portions being indicative of real skin. Moreover, the first biometric feature may be detected based on at least one of: a face recognition, an iris recognition, a retina recognition, a hand geometry recognition, a fingerprint recognition, a vein recognition, and a voice recognition and the method may further include identifying the user based on the detected first biometric features, as discussed above.

The methods as described herein are also implemented in some embodiments as a computer program causing a computer and/or a processor and/or circuitry to perform the method, when being carried out on the computer and/or processor and/or circuitry. In some embodiments, also a non-transitory computer-readable recording medium is provided that stores therein a computer program product, which, when executed by a processor, such as the processor described above, causes the methods described herein to be performed.

Returning to FIG. 1, there is illustrated an apparatus 10, a biometric identifier device in this embodiment. The biometric identifier device 10 has a touch screen display 11 for receiving user input, a biometric detection unit 12, a digital camera 13 which is based on a CCD image sensor, and a flash light 14 which is based on a LED light source.

The biometric detection unit 12 has multiple biometric sensors, including two fingerprint sensors 121*a* and 121*b*, which are based on capacitive scanners and can be used for obtaining two fingerprints of the user. Moreover, the biometric detection unit 12 has a multispectral sensor 122 which enables the apparatus 10 to capture image data within specific wavelength ranges across the electromagnetic spectrum such as the visible light range, the infrared and the ultra-violet, etc. In the present embodiments, the wavelengths are separated by using filters (not shown). Moreover, the multispectral sensor 122 has multiple light sources (not shown) which provide multiple illumination wavelengths and can be controlled to illuminate lights in different angles and multiple polarization conditions can be obtained, as it is generally known to the skilled person.

The display 11, the biometric detection unit 12, the camera 13, the flash light 14 form a part of a circuitry.

The apparatus 10 may also be incorporated in other electronic consumer devices, such as cellular phones e.g. smartphones, smart televisions, video game consoles, or the like.

Figure 2:
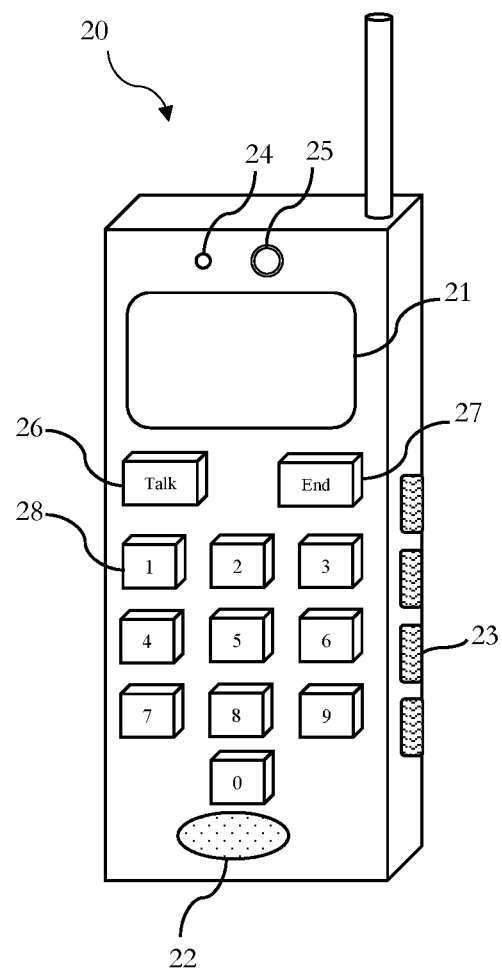
FIG. 2 schematically illustrates an embodiment of an apparatus which is incorporated in a consumer electronic device.

FIG. 2 illustrates an example of an embodiment in which the apparatus is incorporated in a consumer electronic device 20 which in the present embodiment is in a form of a cellular phone. The cellular phone 20 has a circuitry including a touch screen display 21, a microphone 22, a LED flash light 24, and a digital camera 25. The digital camera 25 captures an image of a user's face, iris or retina and provides it to a facial, an iris or a retina recognition software running on the circuitry of the cellular phone 20 or on a remote server, or the like.

The biometric sensors such as the fingerprint sensors may be positioned on the control button in a positon where the user's fingers are likely to be positioned during use of the cellular phone 20.

For instance, the fingerprint sensors may be incorporated into one or more function buttons 26, 27 or numeric keys 28 commonly found on the cellular phone handsets. Moreover the cellular phone 20 may also include designed finger depressions 23 where fingerprint sensors can be located. The cellular phone 20 further includes an antenna, memory, a processor (a CPU), interface, etc., as it is generally known for phones, which along with other parts of the cellular phone 20 form its circuitry.

Moreover, a voice recognition system is incorporated into software which is installed on the processor of the cellular phone that analyzes voice patterns from a user who speaks into the microphone 22.

In the following, an apparatus 30 which is in the form of a cellular phone, is described under the reference of FIG. 3. The cellular phone 30, which may be the same or similar to cellular phone 20, has a touch screen display 31, a biometric sensor 32 which is based on the fingerprint, a digital camera 33, a LED flash light source 34, a processor (CPU) 35 (including one or more processor), which is connected to an interface 36, a storage 37 and a microphone 38. The storage 37 includes a random access memory and a flash storage. The LED flash light source 34 has a known illumination and can be used for capturing images with the known illumination.

Moreover, a voice recognition system is incorporated into software which can be performed by the processor 35 of the cellular phone 30. The voice recognition analyzes voice patterns from a user who speaks into the microphone 38.

The interface 36 is adapted to communicate with a mobile telecommunication system, e.g., LTE, GSM, or the like. It is also adapted to perform wireless communication with a wireless local area network ad, for example, to communicate over Bluetooth. Thereby, the cellular phone 30 can establish a connection to the internet. Moreover, in the present embodiment, the circuitry includes a machine learning algorithm 39. The machine learning algorithm 39 may be located in the memory, on the processor, or it may be located on a remote computer, on a server, or the like.

The digital camera 33 captures an image of the user's face, iris or retina to appropriately configured facial, iris or retina recognition software running on the processor 25 of the cellular phone 30 or on a remote server, or the like, and can further identify a user based on the detected biometric features.

Figure 4:
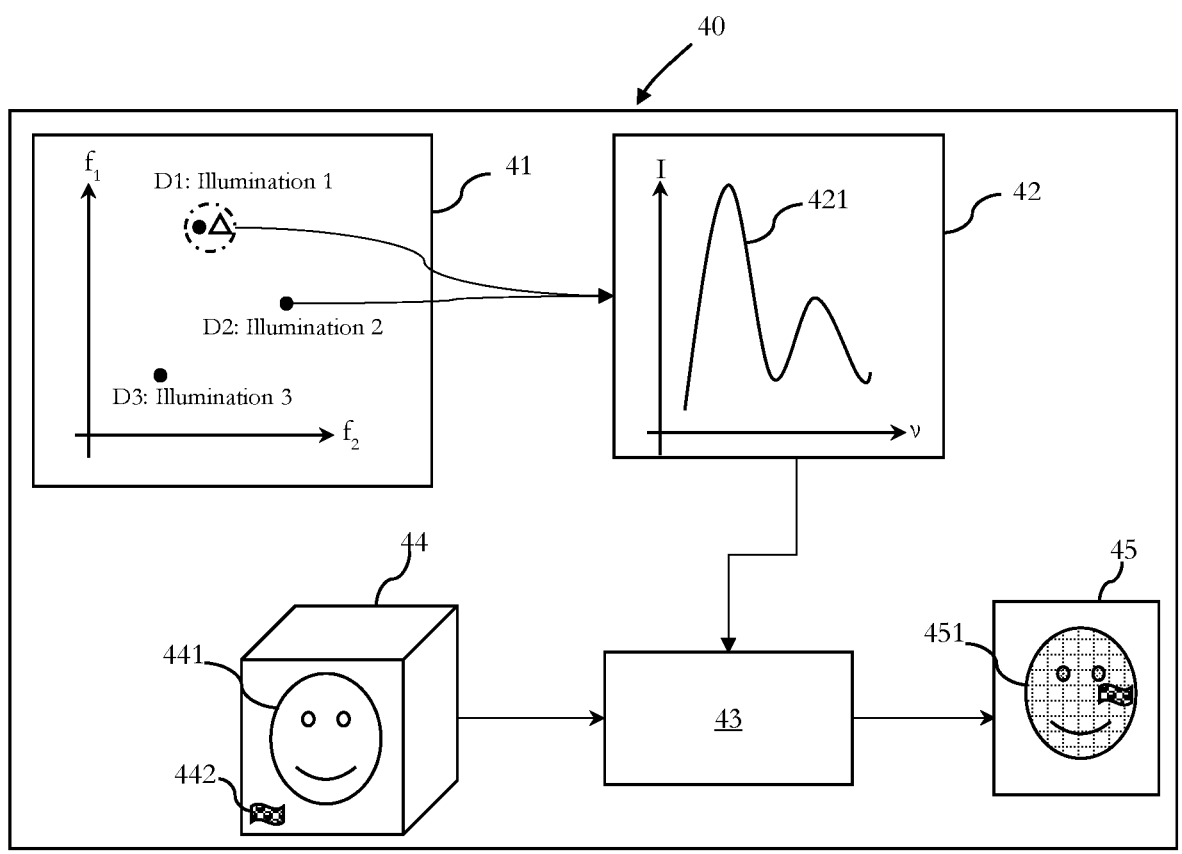
FIG. 4 illustrates a system for estimating illumination indication and generating a skin map.

FIG. 4 illustrates a system 40 for estimating illumination indication and generating a skin map.

The system 40 may be the apparatus including the circuitry, or the apparatus including circuitry may be incorporated in the system 40, without limiting the present disclosure to this specific structure. For example, the system 40 may be a computer, a remote server, or the like.

The system 40 has an imaging unit 41 including a database having image data under the first illumination condition (D1: illumination 1), a second illumination condition (D2: illumination 2) and a third illumination condition (D3: illumination 3). In the present embodiment, the image data of the first illumination condition correspond to the image captured with a flash light source.

Moreover, the system 40 includes an illumination estimation unit 42, which estimates an illumination indication based on the first image data (D1) and the second image data (D2). The estimated illumination indication is the spectral profile 421 of the known illumination (flash light). Moreover, the illumination estimation unit 42 estimates the spectral profile 421 based on a subtracting of the logarithmic derivation of the second image data from the logarithmic derivation of the first image data, as discussed above.

The system 40 further includes a processor 43, a biometric detection unit 44 and a skin map generator 45.

The biometric detection unit 44 includes a multispectral sensor and captures image data within the visible light range and the infrared light range. The image data corresponding to multispectral image data includes image data of a real skin 441 and a non-skin image data 442, in which in the present embodiment, the non-skin image data correspond to an artificial material used as fake skin.

The processor 43 performs a machine learning algorithm. The processor 43 obtains the spectral profile 421 of the known illumination from the illumination estimation unit 42 and the image data (corresponding to multispectral image) from the biometric detection unit 44.

The machine learning algorithm extracts different skin portions from the image data and determines if the skin portions meet a predefined criterion being indicative of real skin. The predefined criterion in this embodiment is an invariant skin feature in different illumination conditions including an illumination condition with the flash and an illumination condition without the flash.

The machine learning algorithm provides the skin portions being indicative of real skin and the skin portions being indicative of non-skin to the skin map generator unit 45.

The skin map generator unit 45 generates a skin map 451, which is based on the image data of real skin 441 and non-skin image data 442. In the skin map 451, the portions being indicative of real skin are differentiated from the portions being indicative of non-skin.

Figure 5:
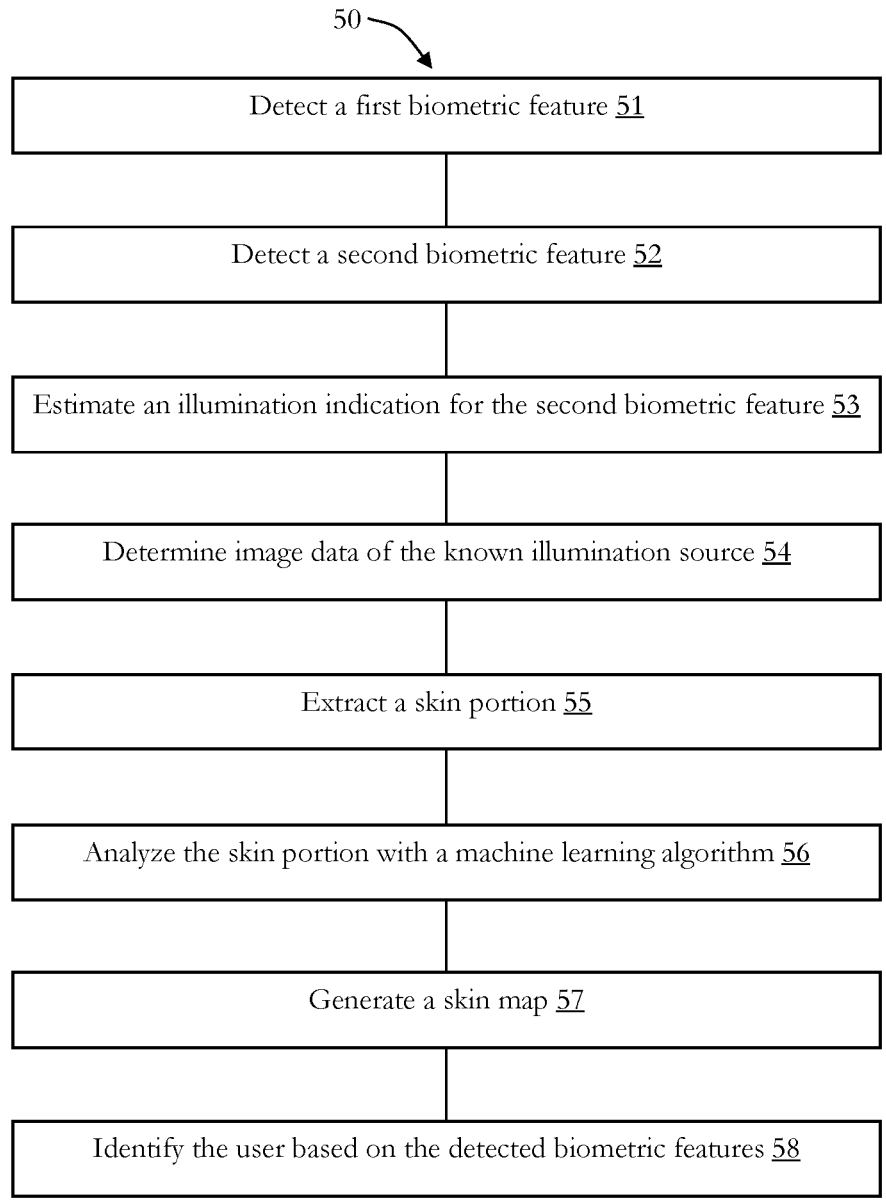
FIG. 5 illustrates a method for detecting biometric features, estimating illumination indication and identifying a user.

FIG. 5 illustrates a method 50 for detecting biometric features, estimating illumination indication and identifying a user. The method 50 may be performed by and with anyone of the apparatus and/or devices and or system that include the apparatus as described herein, such as the apparatus 10 of FIG. 1, the devices 20 and 30 of FIGS. 2 to 3 and the system 40 of the FIG. 4. Without limiting the disclosure in that regard, in the following the method 40 is discussed exemplary based on the cellular phone 30.

At 51, the circuitry detects a first biometric feature of a user. The first biometric feature of the user is a fingerprint and is detected by the fingerprint sensor 32, which is positioned under the control button of the cellular phone 30, as discussed above.

At 52, the circuitry detects a second biometric feature of the user. The digital camera 33 of the cellular phone 30 captures a first image of the user's face while the flash light 34 is turned on, and further captures a second image of the user's face while the flash light 34 is turned off. The circuitry further generates first image data corresponding to the first illumination condition (i.e. the flash light is turned on) and second image data corresponding to the second illumination condition (i.e. flash light is turned off).

The second biometric feature is a skin feature and is detected based on the image data representing the skin feature. Moreover, the second biometric feature (i.e. skin feature) differs from the first biometric feature (i.e. fingerprint), hence, in the present embodiment, multiple biometric features are detected.

At 53, the circuitry estimates an illumination indication for the second biometric feature which is the skin feature. The illumination indication is a chromaticity of the flash light source and is estimated based on the first image data and the second image data, as discussed above. The first image data correspond to a first illumination condition in which the flash light was turned on and the second image data correspond to the second illumination condition in which the flash light was turned off.

At 54, the circuitry determines image data corresponding to the known illumination. In the present embodiment, the known illumination is the flash light and the circuitry determines image data corresponding to the flash light.

A program running on the processor of the circuitry determines a logarithmic derivation of the first image data and the second image data. Moreover, the program subtracts the logarithmic derivation of the second image data from the logarithmic derivation of the first image data. The results of the subtraction is the logarithmic derivation of the image data of the flash light (i.e. known illumination), which can be converted by using an exponential operation to the image data of the flash light.

At 55, the circuitry extracts skin portions from the image data.

As discussed, in the present embodiment, the second biometric feature is the skin feature. Moreover, the skin feature is detected based on the first image data (i.e. under the flash light condition) and the second image data (no-flash condition). Moreover, the machine learning algorithm 39 and/or a program running on the circuitry 35 may extract the skin portions, without limiting the present disclosure in that regard. For example, the program running on the processor 35 of the circuitry or the machine learning algorithm extracts the skin portions. The skin portions are portions which may represent skin, for example, in the present embodiment, in an image captured of the user's face and for which the skin feature is detected, the skin portions may be parts of the skin that are located in, e.g., forehead, cheeks, the skin around eye, the skin around mouth, jaw skin, chin, mole, etc., are extracted.

Moreover, the circuitry extracts the skin portions from the first image data and the second image data, as discussed above.

At 56, the circuitry analyzes the skin portions with the machine learning algorithm 39. The machine learning algorithm 39 is a Scale Invariant Feature Transfer (SIFT) which is based on the feature extraction. The SIFT extracts the skin portions, performs a statistical analysis and determines if the skin portions meet the predetermined criteria. The predetermined criteria are based on the invariant skin characteristics which deliver invariant information in different illumination conditions. Moreover, the machine learning algorithm 39 performs a statistical analysis and determines e.g. mean, standard deviation, etc., for all extracted skin portions in the first image data (i.e. with flash light) and in the second image data (i.e. no flash light). The skin portions that deliver invariant information meet the predefined criterion, and are considered as real skin, and the skin portions that deliver different information in the first image and in the second image are considered to be non-skin.

At 57, the circuitry generates a skin map. The machine learning algorithm 39 of the circuitry generates the skin map by combining skin portions together. The skin map includes all skin portions in this example. Moreover, the skin portions that are indicative of real skin are differentiated from the skin portions that are indicative of non-skin. Hence, a skin map is generated that presents the real skin and non-skin sites.

At 58, the circuitry identifies the user based on the detected biometric feature. A program running on the circuitry converts the image data to an identification barcode. Moreover, there is a database on the storage 37 which stores the identification information of the different users based on their identification barcodes.

The program compares the determined identification barcode with those in the database and identifies the user.

Moreover, the consumer electronic device may be controlled based on the identified user, or the like.

Figure 6:
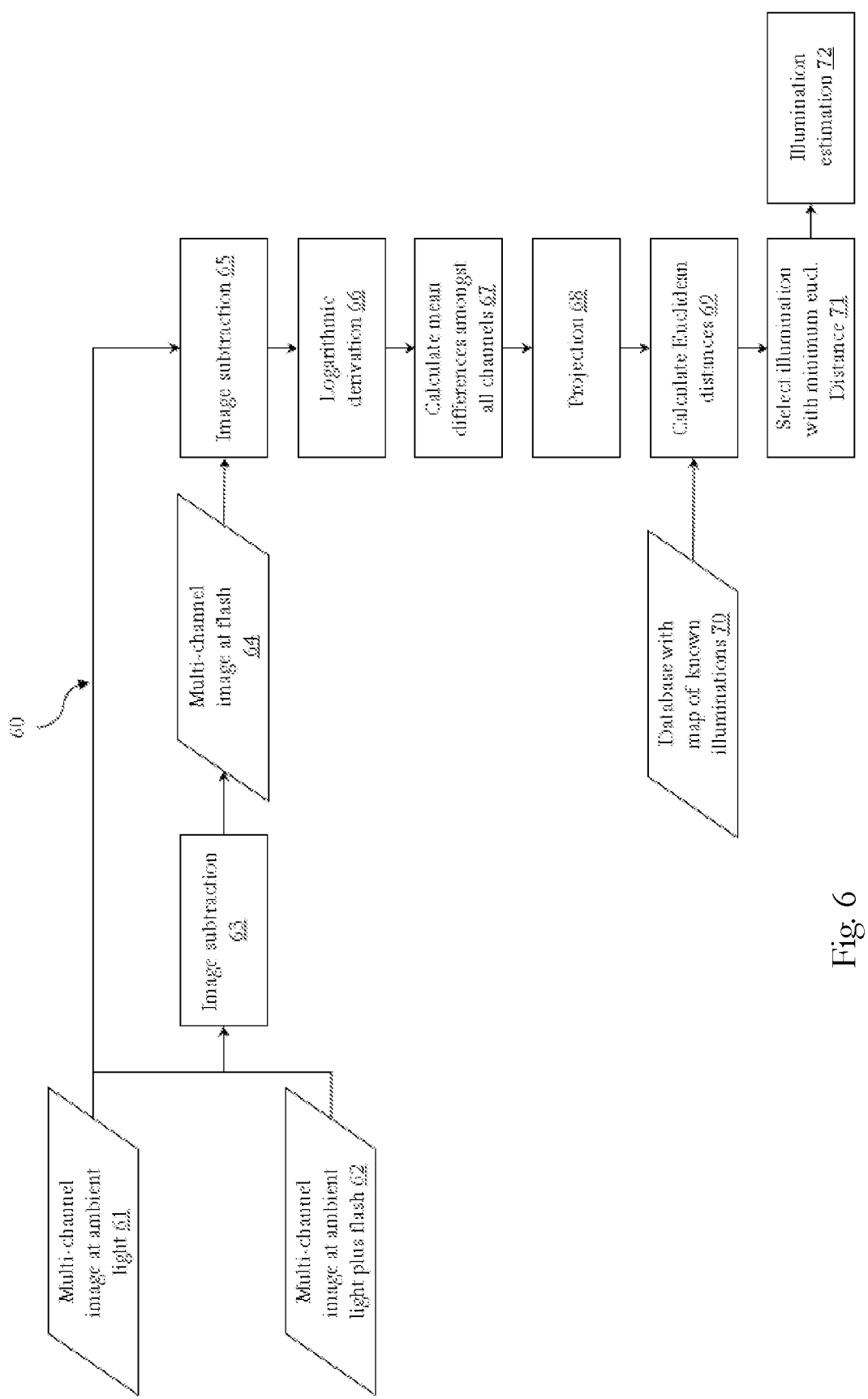
FIG. 6 illustrates a method for estimating an illumination indication by a flash/no-flash method.

FIG. 6 illustrates a method 60 for estimating an illumination indication by a flash/no-flash method. The method 60 may be performed by and with anyone of the apparatus and/or devices and or systems that include the apparatus as described herein, such as the apparatus 10 of FIG. 1, the devices 20 and 30 of FIGS. 2 to 3 and the system 40 of the FIG. 4. Without limiting the disclosure, in the following the method 40 is discussed exemplary based on the cellular phone 30.

At 61, the circuitry captures a Multi-channel image at ambient light. The multi-channel image can be obtained by the image sensor 33 or by the biometric sensor 32 which includes a multispectral sensor, without limiting the present disclosure in that regard.

At 62, the circuitry captures a multi-channel image at ambient light while the flash 33 is turned on. The multi-channel image can be obtained by the image sensor 33 or by the biometric sensor 32 which includes a multispectral sensor, without limiting the present disclosure in that regard.

At 63, the circuitry performs an image subtraction, the image subtraction is performed by a program running on the processor 35 of the circuitry, as it is generally known to the skilled person.

At 64, the circuitry determines a multi-channel image for the pure flash. The program running on the processor 35 of the circuitry determines the multi-channel image of the pure flash, based on the image subtraction, as discussed above.

At 65, the circuitry performs an image subtraction, which is performed by the program running on the processor of the circuitry and the multi-channel image of the pure flash is subtracted from the multi-channel image at ambient light plus flash, as it is generally known to the skilled person.

At 66, a logarithmic derivation of the image data is obtained, and the program running on the circuitry 35, determines the logarithmic derivation of the image data.

At 67, the circuitry calculates mean differences amongst all channels, and the program running on the circuitry 35 calculates mean differences, as it is generally known to the skilled person.

At 68, the circuitry projects the image data into a geometric-mean chromaticity space, as discussed above.

At 69, the circuitry calculates the Euclidean distances. The program running on the circuitry 35 calculates the Euclidean distances, as discussed above.

At 70, the circuitry obtains via its interface 36, the Euclidean distances from a database includes illumination map of known illuminations.

At 71, the circuitry selects an illumination in which its mean value has the least Euclidean distance from the mean value of the determined image data.

At 72, the circuitry estimates an illumination indication. The illumination indication may be estimated by the program running on the processor 35 of the circuitry and is estimated based on the known illumination source in the database which has the minimum Euclidean distances.

Figure 7:
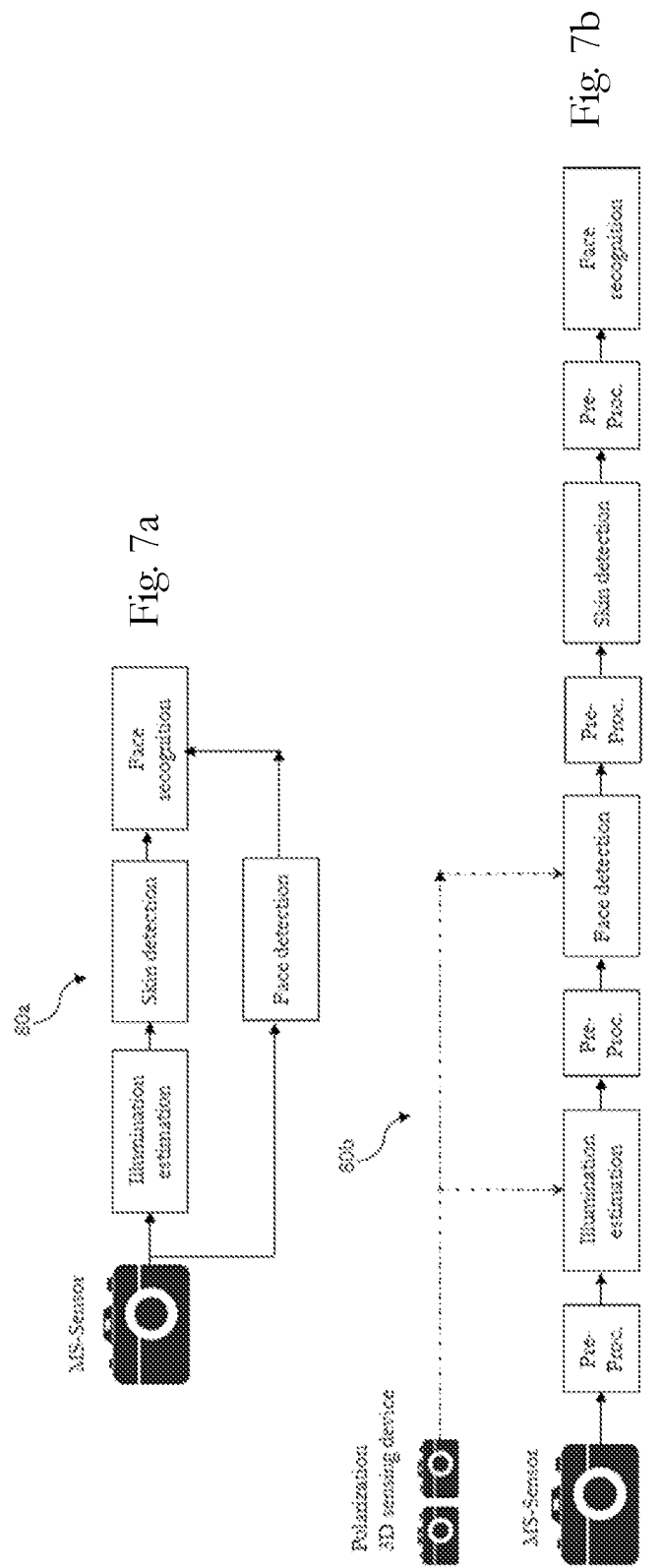
FIGS. 7a and 7b schematically illustrate an embodiment of a system for performing a face recognition.

FIGS. 7*a* and 7*b* schematically illustrate an embodiment of a system 80*a* and an embodiment of a system 80*b* for performing a face recognition. The systems 80*a* and 80*b* may be the apparatus including the circuitry, or the apparatus including circuitry may be incorporated in the systems 80*a* and 80*b*, without limiting the present disclosure to a specific structure in that regard. For example, the system 80*a* and/or the system 80*b* may be a computer, a remote server, or the like.

The face recognition can be performed, in parallel and or sequentially with other biometric features including, illumination estimation, skin detection and face detection.

FIG. 7a represents an embodiment in which a face detection is performed in parallel with an illumination estimation and a skin detection. Afterwards, the detected biometric features are used and a face recognition is performed.

Moreover, in the present embodiment, the face detection (i.e. the first biometric feature of the user) is used for identifying the user, and the skin detection feature (i.e. the second biometric feature) is used for discriminating between a biometric feature and a non-biometric feature, i.e., verifying if the face detection feature is a real biometric feature that belongs to a real human face or is a non-biometric feature such as a fake material that is used on the face, or the like.

Furthermore, the skin detection feature is performed on the corresponding area where the face detection feature was located.

In addition, in the present embodiment, the circuitry provided a probability value of 100 for the skin detection feature, in which it is indicative of the probability of being a real biometric feature is 100%.

Moreover, the second biometric feature has been indicative of a real biometric feature, then, the circuitry used the first biometric feature (i.e. the face detection) and identified the user, and afterward, the circuitry authenticated the user.

FIG. 7b represents an embodiment in which an illumination estimation, a face detection, a skin detection and a face recognition are performed sequentially. Moreover, a preprocessing of the image data is performed before each biometric feature detection.

Also, in addition to the multispectral image data, several other modalities such as polarization information and 3D information are also used for illumination estimation and for face detection.

Figure 8:
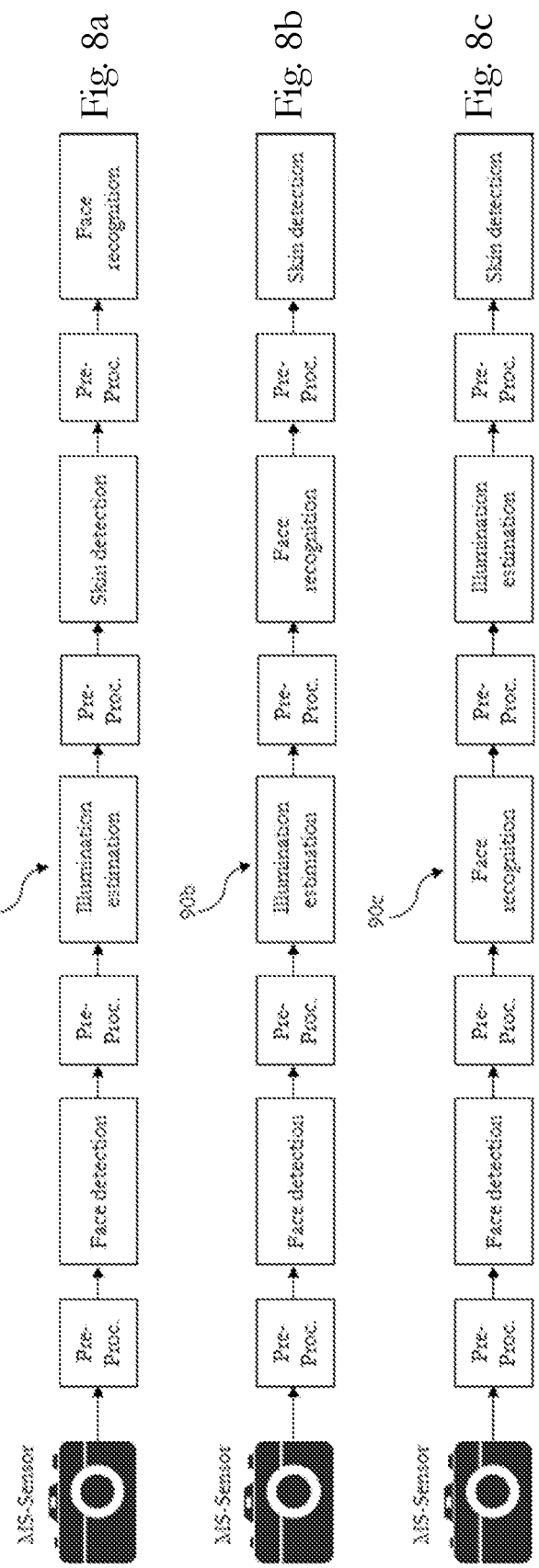
FIGS. 8a, 8b and 8c illustrate a schematic diagram of an embodiment of a system for detecting multiple biometric features and estimating illumination indication.

FIGS. 8a, 8b and 8c illustrate a schematic diagram of an embodiment of a system 90a, an embodiment of a system 90b, and an embodiment of a system 90c for detecting multiple biometric features and estimating illumination indication. The systems 90a, 90b and 90c may be the apparatus including the circuitry, or the apparatus including circuitry may be incorporated in the systems 90a, 90b and 90c, without limiting the present disclosure to a specific structure in that regard. For example, the system 90a and/or the system 90b and/or the system 90c may be a computer, a remote server, or the like.

FIG. 8a represents an embodiment in which the image data of a multispectral sensor is used. Moreover, the image data is preprocessed.

According to FIG. 8a, multiple biometric features detections with consecutive order of, a face detection, an illumination estimation, a skin detection, and a face recognition are performed. Moreover, before detecting each biometric feature and before illumination estimation, the image data are preprocessed, accordingly.

Moreover, FIGS. 8b and 8c represent two different orders of detecting multiple biometric features of the FIG. 8a and estimating illumination. As can be taken from FIGS. 8a, 8b and 8c, there is no limitation on the order of detecting different biometric features.

Figure 9:
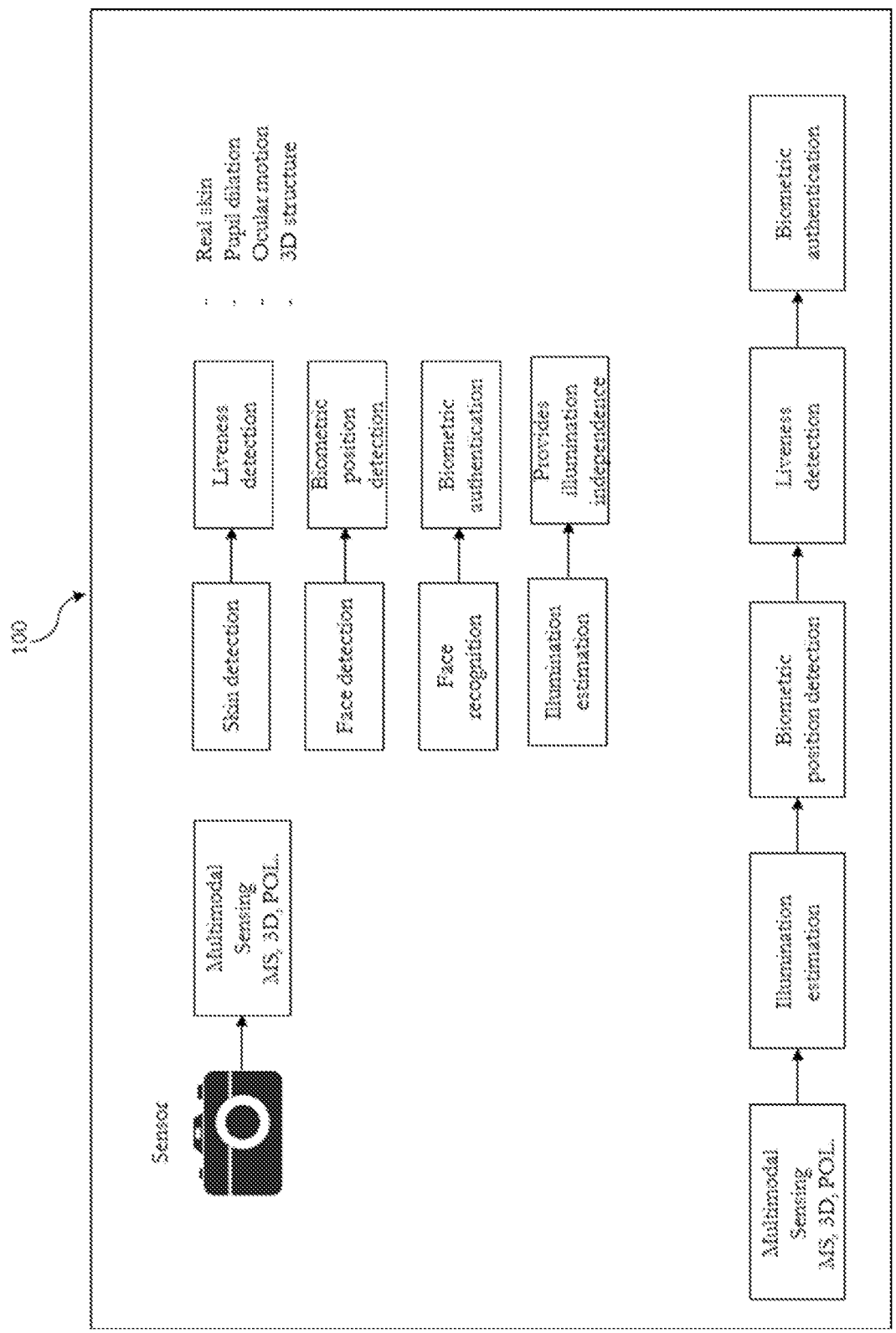
FIG. 9 illustrates a schematic diagram of an embodiment of a system for performing a biometric authentication.

FIG. 9 illustrates a schematic diagram of an embodiment of a system 100 performing a biometric authentication. The system 100 may be the apparatus including the circuitry, or the apparatus including circuitry may be incorporated in the system 100, without limiting the present disclosure to a specific structure in that regard. For example, the system 100 may be a computer, a remote server, or the like.

The image data of a multispectral image sensor are used. The image data include multispectral image data, 3D information and polarization information.

Different biometric features can be provided and can be used for obtaining different information. For example, a skin detection is used for liveness detection, a face detection is used for biometric position detection, a face recognition is used for biometric authentication, and an illumination estimation is used for determining illumination independence information.

Hence, the image data are used, and sequentially, an illumination estimation, a biometric position detection, a liveness detection and a biometric authentication are performed.

Moreover, there is no limit on detecting different biometric features. For instance, the sequential procedure may further include a real skin detection, pupil dilation, ocular motion detection, 3D structure, etc.

FIGS. 10a, 10b and 10c illustrate a schematic diagram of an embodiment of a system 110a, an embodiment of a system 110b, and an embodiment of a system 110c for detecting multiple biometric features. The systems 110a, 110b and 110c may be the apparatus including the circuitry, or the apparatus including circuitry may be incorporated in the systems 110a, 110b and 110c, without limiting the present disclosure to a specific structure in that regard. For example, the system 110a and/or the system 110b and/or the system 110c may be a computer, a remote server, or the like.

FIG. 10a represents a procedure in which the image data of a multispectral image sensor are used and an illumination indication is estimated. Moreover, an iris localization, an ocular liveness detection and an iris recognition are performed, sequentially.

FIG. 10b represents a procedure in which the image data of a multispectral image sensor are used and an illumination indication is estimated. Moreover, a finger localization, a skin detection and a fingerprint recognition are performed, sequentially.

FIG. 10c represents a procedure in which the image data of a multispectral image sensor are used and an illumination indication is estimated. Moreover, a back of hand localization, a skin detection and a vein recognition are performed, sequentially.

It should be recognized that the embodiments describe methods with an exemplary ordering of method steps. The specific ordering of method steps is however given for illustrative purposes only and should not be construed as binding. For example the ordering of 54 and 55 in the embodiment of FIG. 5 may be exchanged. Further, also the ordering of 53 and 55 in the embodiment of FIG. 5 may be exchanged. Other changes of the ordering of method steps may be apparent to the skilled person.

Figure 3:
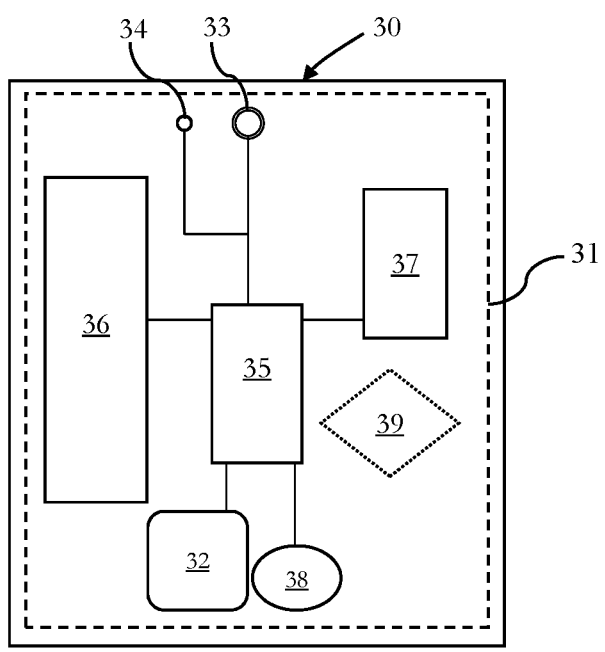
FIG. 3 schematically illustrates an embodiment of an apparatus including a circuitry for detecting biometric features and identifying a user.

Please note that the division of the circuitry of FIG. 3 into units 31 to 39 is only made for illustration purposes and that the present disclosure is not limited to any specific division of functions in specific units. For instance, the circuitry of FIG. 3 could be implemented by a respective programmed processor, field programmable gate array (FPGA) and the like.

A method for controlling an electronic device, such as a consumer electronic device 30 discussed above, is described in the following and under reference of FIG. 5. The method can also be implemented as a computer program causing a computer and/or a processor, such as processor 35 discussed above, to perform the method, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An apparatus comprising circuitry configured to:
 detect a first biometric feature of a user;
 detect a second biometric feature of the user, wherein the second biometric feature is detected based on image data representing the second biometric feature, and wherein the second biometric feature differs from the first biometric feature; and
 estimate an illumination indication for the second biometric feature, based on the image data.

(2) The apparatus of (1), wherein the first biometric feature of the user is to be used for identifying an individual, and the second biometric feature is to be used for discriminating between biometric feature and non-biometric feature.

(3) The apparatus of (1) or (2), wherein the first biometric feature detection is performed on a corresponding area where the second biometric feature is detected as the biometric feature.

(4) The apparatus of anyone of (1) to (3), wherein the second biometric feature detection is performed on a corresponding area where the first biometric feature is located.

(5) The apparatus of anyone of (1) to (4), wherein the circuitry is further configured to authenticate the user identified based on the first biometric feature when the second biometric feature indicates a biometric feature.

(6) The apparatus of anyone of (1) to (5), wherein the second biometric feature is a binary value indicating a real biometric feature or a fake biometric feature.

(7) The apparatus of anyone of (1) to (6), wherein the second biometric feature is a value indicating a probability of a real biometric feature.

(8) The apparatus of anyone of (1) to (7), wherein the second biometric feature is a skin feature, and wherein the circuitry is further configured to estimate the illumination indication for the skin feature.

(9) The apparatus of anyone of (1) to (8), wherein the illumination indication is estimated based on first image data and second image data, and wherein the first image data correspond to a first illumination condition and the second image data correspond to the second illumination condition.

(10) The apparatus of anyone of (1) to (9), wherein the first illumination condition corresponds to an image captured with a known illumination source.

(11) The apparatus of anyone of (1) to (10), wherein the circuitry is further configured to determine image data corresponding to the known illumination source, based on subtracting a logarithmic derivation of the first image data and the second mage data.

(12) The apparatus of anyone of (1) to (11), wherein the circuitry is further configured to extract a skin portion from the first image data and the second image data.

(13) The apparatus of anyone of (1) to (12), wherein the circuitry is further configured to analyze the skin portion with a machine learning algorithm configured to determine whether the skin portion meets a predefined criterion being indicative of real skin.

(14) The apparatus of anyone of (1) to (13), wherein the circuitry is further configured to generate a skin map based on the machine learning algorithm, and the skin portions being indicative of real skin.

(15) The apparatus of anyone of (1) to (14), wherein the first biometric feature is detected based on at least one of a face recognition, an iris recognition, a retina recognition, a hand geometry recognition, a fingerprint recognition, a vein recognition, and a voice recognition.

(16) The apparatus of anyone of (1) to (15), wherein the circuitry is further configured to identify the user based on the detected first biometric features.

(17) A method comprising:
 detecting a first biometric feature of a user;
 detecting a second biometric feature of the user, wherein the second biometric feature is detected based on image data representing the second biometric feature, and wherein the second biometric feature differs from the first biometric feature; and
 estimating an illumination indication for the second biometric feature, based on the image data.

(18) The method of (17), wherein the first biometric feature of the user is to be used for identifying an individual, and the second biometric feature is to be used for discriminating between biometric feature and non-biometric feature.

(19) The method of (17) or (18), wherein the first biometric feature detection is performed on a corresponding area where the second biometric feature is detected as the biometric feature.

(20) The method of anyone of (17) to (19), wherein the second biometric feature detection is performed on a corresponding area where the first biometric feature is located.

(21) The method of anyone of (17) to (20), wherein the method further comprises authenticating the user identified based on the first biometric feature when the second biometric feature indicates a biometric feature.

(22) The method of anyone of (17) to (21), wherein the second biometric feature is a binary value indicating a real biometric feature or a fake biometric feature.

(23) The method of anyone of (17) to (22), wherein the second biometric feature is a value indicating a probability of a real biometric feature.

(24) The method of anyone of (17) to (23), wherein the second biometric feature is a skin feature, and wherein the method further comprises estimating the illumination indication for the skin feature.

(25) The method of anyone of (17) or (24), wherein the illumination indication is estimated based on first image data and second image data, and wherein the first image data correspond to a first illumination condition and the second image data correspond to the second illumination condition.

(26) The method of anyone of (17) to (25), wherein the first illumination condition corresponds to an image captured with a known illumination source.

(27) The method of anyone of (17) to (26), wherein the method further comprises determining image data corresponding to the known illumination source, based on subtracting a logarithmic derivation of the first image data and the second mage data.

(28) The method of anyone of (17) to (27), wherein the method further comprises extracting a skin portion from the first image data and the second image data.

(29) The method of anyone of (17) to (28), wherein the method further comprises analyzing the skin portion with a machine learning algorithm configured to determine whether the skin portion meets a predefined criterion being indicative of real skin.

(30) The method of anyone of (17) to (29), wherein the method further comprises generating a skin map based on the machine learning algorithm, and the skin portions being indicative of real skin.

(31) The method of anyone of (17) to (30), wherein the first biometric feature is detected based on at least one of a face recognition, an iris recognition, a retina recognition, a hand geometry recognition, a fingerprint recognition, a vein recognition, and a voice recognition.

(32) The method of anyone of (17) to (31), wherein the method further comprises identifying the user based on the detected first biometric features.

(33) A computer program comprising program code causing a computer to perform the method according to anyone of (17) to (32), when being carried out on a computer.

(34) A non-transitory computer-readable recording medium that stores therein a computer program product, which, when executed by a processor, causes the method according to anyone of (17) to (32) to be performed.

The invention claimed is:

1. An apparatus comprising circuitry configured to:
detect a first biometric feature of a user;
detect a second biometric feature of the user, wherein the second biometric feature is detected based on image data representing the second biometric feature, and wherein the second biometric feature differs from the first biometric feature; and
estimate an illumination indication for the second biometric feature, based on the image data, wherein
the illumination indication is estimated based on first image data and second image data, the first image data corresponding to a first illumination condition and the second image data corresponding to the second illumination condition,
the first illumination condition corresponds to an image captured with a known illumination source, and
the circuitry is further configured to determine image data corresponding to the known illumination source, based on subtracting a logarithmic derivation of the first image data and the second image data.

2. The apparatus of claim 1, wherein the first biometric feature of the user is to be used for identifying an individual, and the second biometric feature is to be used for discriminating between biometric feature and non-biometric feature.

3. The apparatus of claim 2, wherein the first biometric feature detection is performed on a corresponding area where the second biometric feature is detected as the biometric feature.

4. The apparatus of claim 2, wherein the second biometric feature detection is performed on a corresponding area where the first biometric feature is located.

5. The apparatus of claim 2, wherein the circuitry is further configured to authenticate the user identified based on the first biometric feature when the second biometric feature indicates a biometric feature.

6. The apparatus of claim 2, wherein the second biometric feature is a binary value indicating a real biometric feature or a fake biometric feature.

7. The apparatus of claim 2, wherein the second biometric feature is a value indicating a probability of a real biometric feature.

8. The apparatus of claim 1, wherein the second biometric feature is a skin feature, and wherein the circuitry is further configured to estimate the illumination indication for the skin feature.

9. The apparatus of claim 1, wherein the circuitry is further configured to extract a skin portion from the first image data and the second image data.

10. The apparatus of claim 9, wherein the circuitry is further configured to analyze the skin portion with a machine learning algorithm configured to determine whether the skin portion meets a predefined criterion being indicative of real skin.

11. The apparatus of claim 10, wherein the circuitry is further configured to generate a skin map based on the machine learning algorithm, and the skin portions being indicative of real skin.

12. The apparatus of claim 1, wherein the first biometric feature is detected based on at least one of a face recognition, an iris recognition, a retina recognition, a hand geometry recognition, a fingerprint recognition, a vein recognition, and a voice recognition.

13. The apparatus of claim 1, wherein the circuitry is further configured to identify the user based on the detected first biometric features.

14. A method comprising:
detecting a first biometric feature of a user;
detecting a second biometric feature of the user, wherein the second biometric feature is detected based on image data representing the second biometric feature, and wherein the second biometric feature differs from the first biometric feature; and
estimating an illumination indication for the second biometric feature, based on the image data, wherein
the illumination indication is estimated based on first image data and second image data, the first image data corresponding to a first illumination condition and the second image data corresponding to the second illumination condition,
the first illumination condition corresponds to an image captured with a known illumination source, and
the method further comprises determining image data corresponding to the known illumination source, based on subtracting a logarithmic derivation of the first image data and the second image data.

15. The method of claim 14, wherein the method further comprises extracting a skin portion from the first image data and the second image data.

16. The method of claim 15, wherein the method further comprises analyzing the skin portion with a machine learning algorithm configured to determine whether the skin portion meets a predefined criterion being indicative of real skin.

17. The method of claim 16, wherein the method further comprises generating a skin map based on the machine learning algorithm, and the skin portions being indicative of real skin.

* * * * *